United States Patent
Lunsford (12)

(10) Patent No.: US 6,507,336 B1
(45) Date of Patent: *Jan. 14, 2003

(54) KEYBOARD FOR A HANDHELD COMPUTER

(75) Inventor: E. Michael Lunsford, San Carlos, CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,673

(22) Filed: May 16, 2000

Related U.S. Application Data

(63) Continuation-in-part of application No. 09/573,451, filed on May 16, 2000, which is a continuation-in-part of application No. 09/484,086, filed on Jan. 18, 2000, which is a continuation-in-part of application No. 09/502,169, filed on Feb. 11, 2000, which is a continuation-in-part of application No. 09/451,630, filed on Nov. 30, 1999, which is a continuation-in-part of application No. 09/271,057, filed on Mar. 16, 1999, which is a continuation-in-part of application No. 09/244,440, filed on Feb. 4, 1999, which is a continuation-in-part of application No. 09/246,781, filed on Feb. 4, 1999, which is a continuation-in-part of application No. 09/244,613, filed on Feb. 4, 1999.

(51) Int. Cl.$^7$ .............................. G09G 5/00; H04B 1/38; G06F 1/16
(52) U.S. Cl. ..................... 345/168; 345/169; 345/179; 345/901; 345/905; 361/680; 361/686; 455/575
(58) Field of Search ................................. 345/156, 169, 345/173, 179, 168, 901, 905; 361/680, 681, 686, 679; 455/575

(56) References Cited

U.S. PATENT DOCUMENTS

| | | | |
|---|---|---|---|
| 5,646,649 A | * | 7/1997 | Iwata et al. .................. 345/173 |
| D392,968 S | * | 3/1998 | Johansson ................... D14/144 |
| D398,307 S | * | 9/1998 | Collins ....................... D14/144 |
| 5,949,408 A | * | 9/1999 | Kang et al. .................. 345/169 |
| 6,239,968 B1 | * | 5/2001 | Kim et al. ................... 361/679 |
| 6,266,240 B1 | * | 7/2001 | Urban et al. ................. 361/686 |
| 6,283,777 B1 | * | 9/2001 | Canova et al. .............. 361/686 |
| 6,356,442 B1 | * | 3/2002 | Lunsford .................... 361/686 |

* cited by examiner

Primary Examiner—Bipin Shalwala
Assistant Examiner—David L. Lewis
(74) Attorney, Agent, or Firm—Van Mahamedi; Hickman Truong Palermo & Becker LLP

(57) ABSTRACT

A data entry mechanism for a handheld computer is provided. The data entry mechanism comprises: a plurality of keys configured to be actuated by a stylus of the handheld computer, each of the plurality of keys being electronically coupleable to the handheld computer and generating an electronic signal upon actuation by the stylus; and an encasement structure to retain the plurality of keys, the structure being engagable with a slot of the handheld computer. The data entry mechanism may be used to facilitate data input to a computing or a telecommunications device.

32 Claims, 10 Drawing Sheets

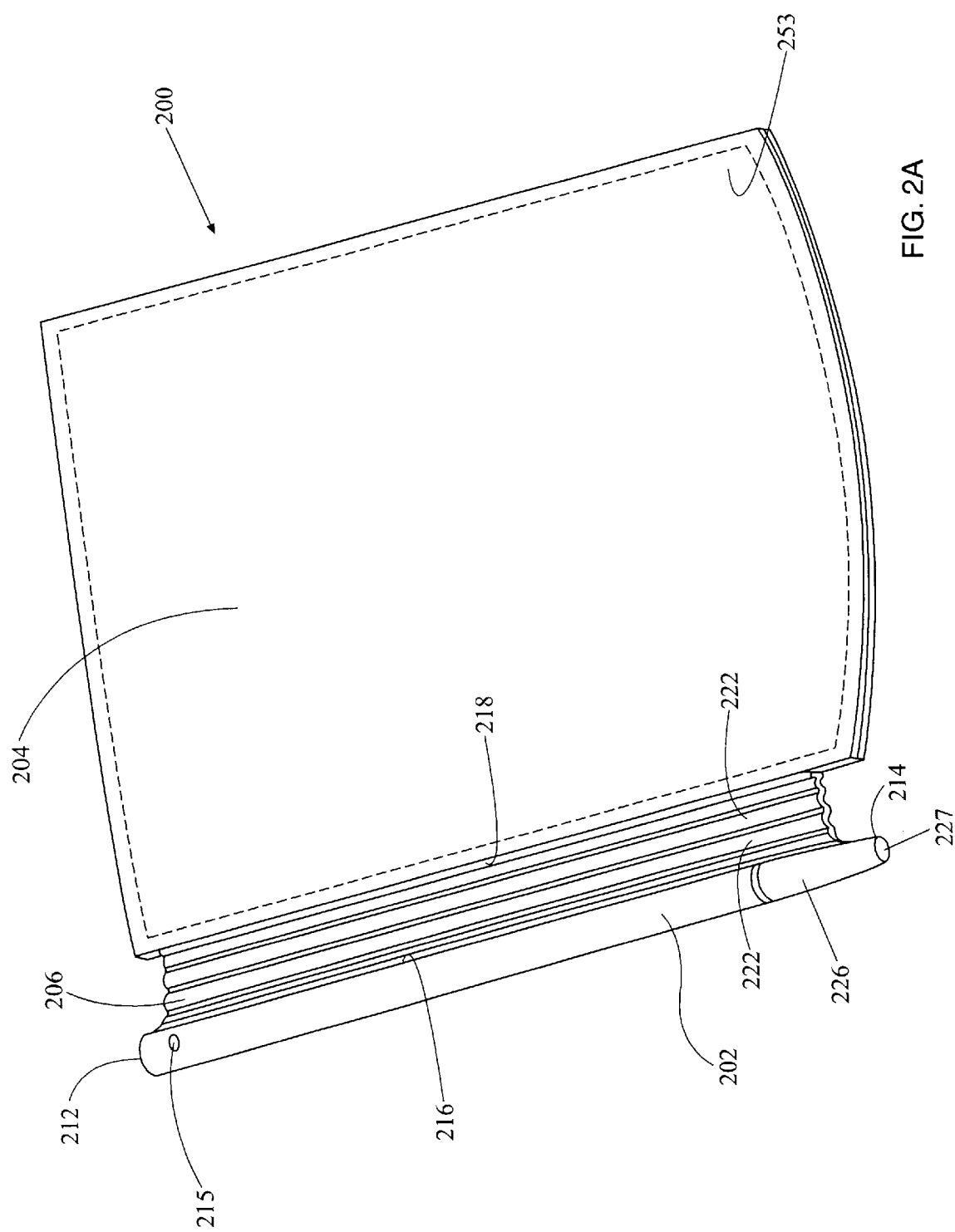

KEYBOARD FOR A HANDHELD COMPUTER

CROSS REFERENCE TO RELATED APPLICATIONS

This application is a continuation-in-part of application Ser. No1. 09/573,451, filed May 16. 2000, entitled "Electronically-Enabled Encasement for a Handheld Computer"; Application Ser. No. 09/484,086, filed Jan. 18, 2000, entitled "Connector For Handheld Computer"; Application Ser. No. 09/502,169, filed Feb. 11, 2000, entitled "Encasement For a Handheld Computer": Application Ser. No. 09/451,630, filed Nov. 30, 1999, entitled "Cover Far A Handheld Computer": Application Ser. No. 09/271,057, filed Mar. 16, 1999, entitled "Dual Action Stylus For A Handheld Computer,"; Application Ser. No. 09/244,440, filed Feb. 4, 1999, entitled "Handheld Computer"; Application Ser. No. 09/246,781, filed Feb. 4, 1999, entitled "Handled Computer"; and Application Ser. No. 09/244,613, filed Feb. 4, 1999, entitled "Handheld Computer"; all of which are hereby incorporated by reference for this application.

BACKGROUND OF THE INVENTION

1. Field of the Invention

This invention relates to the field of handheld computers. In particular, the invention relates to a keyboard for a handheld computer.

2. Description of the Related Art

Handheld computers, including personal digital assistants and palm-sized computers (PDA), provide the user with a wide variety of functions, such as a calendar, an address book, a task list, a notepad, and a calculator. These handheld computers may be approximately the size of a stack of 3"×5" index cards, sufficiently compact to fit into a shirt pocket.

Current handheld computers, such as the PalmPilo® from Palm Inc., typically have a display screen and a plurality of manually actuatable buttons for a user to control the operation of the computer. The bottoms are typically convex in shape and protrude from the surface in which they are mounted, thereby enhancing their functional accessibility.

The display screen can be a touch sensitive screen so as to function as a user input device. A stylus can be used in conjunction with such a touch screen as to permit the touch screen to be segmented into fields that are too small to be individually actuated by an average human figure.

These stylus-input computers are primarily operated by a user using a stylus as the input device. Such an input device is inherently suited to enter input through the display. For example, the user can tap icons showing commands on the screen using the tip of the stylus.

However, this type of input device tends to more suitable for graphical rather than character-based input. To input characters, a user can tap on a virtual keyboard displayed on the screen to actuate each key or use scratches on a Graffiti™ segment of the display. Due to the limitation to the size of the screen, the virtual keyboard is much smaller than a standard keyboard, rendering it difficult for a user to identify each key and requiring a small stylus tip to acturate.

Foldable computer keyboards have been developed to enable a user to input characters by the conventional method, i.e., by touching and depressing the key buttons with his/her fingers to send electronic signal to a handheld computer or a notebook computer. Although more compact than a standard keyboard, such foldable keyboards are still too large to be considered an integral part of a handheld computer which demands more "pocket-friendly" sizes.

Another disadvantage associated with a separate, finger-tappable keyboard is that such an input mechanism is cumbersome for a stylus-based handheld computer. Typically, the user of a handheld computer holds the computer in one hand and uses the other hand to touch the screen with a stylus. When a user needs to type a character into the computer, the user has to either put down the stylus and free his/her hands to tap the keyboard, or rotate his/her hand inward to use the unoccupied finger(s) to tap the key board button(s). Such an operation is inefficient and ergonomically disadvantageous.

SUMMARY OF THE INVENTION

A data entry mechanism for a handheld computer is provided. The data entry mechanism comprises: a plurality of keys configured to be actuated by a stylus of the handheld computer, each of the plurality of keys being electronically coupleable to the handheld computer and generating an electronic signal upon actuation by the stylus; and an encasement structure to retain the plurality of keys, the structure being engagable with a slot of the handheld computer. The data entry mechanism may be used to facilitate data input to a computing or a telecommunications device.

BRIEF DESCRIPTION OF THE FIGURES

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters designate the same parts. It should be noted that the features illustrated in the drawings are not necessarily drawn to scale.

FIG. 1A is a frontal view of the handheld computer.

FIG. 1B is an exploded isometric view showing components of the handheld computer, under an embodiment of the invention.

FIG. 1C is a top view of the handheld computer illustrating a housing of the handheld computer, under an embodiment of the invention.

FIG. 1D is a side view of the handheld computer illustrating the housing and an accessorial slot under an embodiment of the invention.

FIGS. 2A–C illustrate a keyboard, under an embodiment of the invention.

FIG. 2A illustrates a keyboard embedded in a front cover of an encasement for a handheld computer illustrated in FIG. 1A–D.

FIG. 2B illustrates a forward top perspective view of a keyboard.

FIG. 3A illustrates the encasement in an opened position.

FIG. 3B illustrates the encasement having a handheld computer encased therein.

FIG. 3C is the frontal view of the encasement in a closed positioin.

DETAILED DESCRIPTION OF THE PREFERRED EMBODIMENTS

Figure 1A:
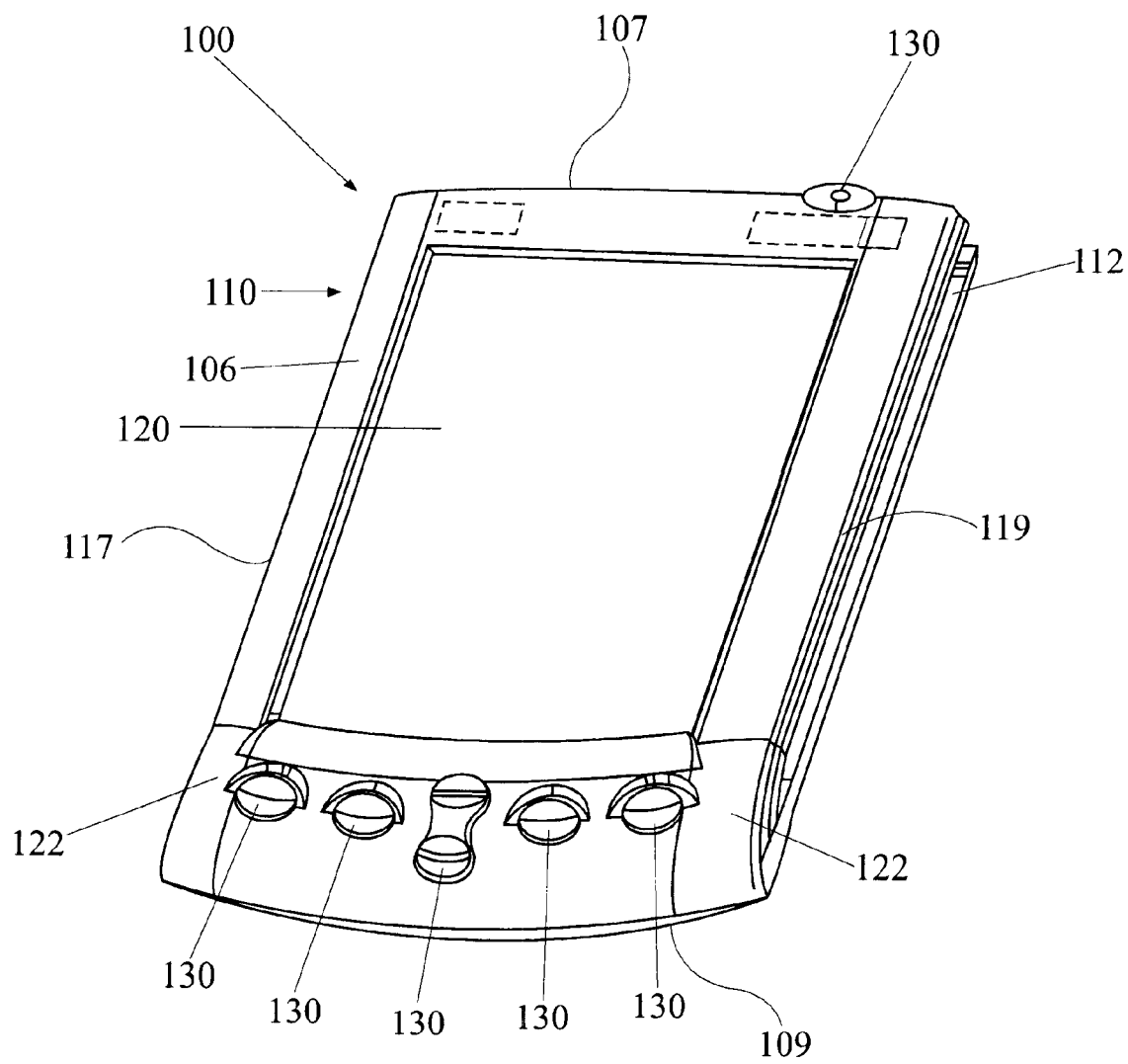
FIGS. 1A–1D illustrate a handheld computer, under an embodiment of the invention.

An embodiment of the invention includes a data entry mechanism for a handheld computer, in particular, a keyboard that can be conveniently operated by using a stylus. A stylus-tappable keyboard has a plurality of key buttons, at least one of which is dimensioned to receive the tip of a stylus and preferably to define a concave surface or an indent/dimple to allow easy access by the stylus. Optionally, the keyboard may also be finger-tappable, i.e. accessible to a human finger which actuates the key by touching the button. Such a keyboard can be incorporated into an encasement for a handheld computer. Alternatively, the keyboard is attachable to the front surface of the handheld computer.

The data entry mechanism of the present invention may be used in a wide variety of computing devices, especially portable palm-sized computers, such as personal data assistants. The invention can be utilized in conjunction with palm-sized computers that include communication links, such as cables (e.g. serial or parallel) or wireless transceivers (e.g., infrared or radio frequency). The invention can also utilize data processing methods that transform the user input signals so as to actuate interconnected discrete hardware elements, for example, to launch a software application.

In an embodiment, the dimensions of the keyboard conform to a shape of the handheld computer. Therefore, the size of the keyboard is significantly smaller than a conventional keyboard, such as a standard-sized keyboard separately connected to a desktop computer (about 18"×7" in surface dimension) or a keyboard incorporated into a notebook computer (about 10"×5" in surface dimension). The keyboard of the present invention has a flat surface dimension similar to or smaller than that of a typical handheld computer (about 5"×3").

With such a miniaturized keyboard into the front face of an encasement for a handheld computer, the overall size of the assembly remains relatively unchanged. Compared to a foldable keyboard developed for a handheld computer, the keyboard of the present invention is more compact. In addition, because the keyboard of the present invention can be securely attached to the computer, it is more stable than a collapsible, foldable keyboard where the linkage between the keys are subject to twists and turning.

Further, compared to a virtual keyboard displayed on the screen of a handheld computer, the keyboard of the present invention does not occupy valuable screen space, thus allowing bigger and/or more images to be displayed on the screen. The characters on the keyboard of the present invention should be more visible than those of the same size displayed on the screen because of glare of the screen and the intrinsic visibility problems associated with LCD screens. Moreover, using a separate keyboard for data entry eliminates the steps of calling up and dismissing the virtual keyboard from the screen when the data input is finished. Therefore the whole process of data input can be more time efficient.

In addition, for a conventional keyboard the key buttons are typically convex in shape so as to allow easy access by an average human finger. By contrast, the key buttons of the keyboard according to the present invention has a concave surface or an indent/dimple to allow easy access by a stylus. By touching the concave surface of the key button with the tip of the stylus, the user firmly actuates the key to generate electronic signal without letting the tip to slip off the button. Because the tip of the stylus is much smaller than an average human figure tip, the size of the key button can be reduced without sacrificing firm control by the stylus. Also, because the key button has a concave, not a convex surface, the top surface of the keyboard can be below the surface of the encasement cover. Such a design avoids undesirable contact or friction against the display screen and further reduces the overall bulkiness of the handheld computer.

The stylus-tappable keyboard of the present invention can also be a useful tool for handicapped users. Since the keys can be effectively actuated by a stylus, instead of being limited to use by a human finger, a user with a physical disability such as malfunctioning fingers or quadriplegia can use his/her mouth to hold the stylus and tap the keyboard to enter input.

The invention and the various features and advantageous details thereof are explained more fully with reference to the non-limiting embodiments that are illustrated in the accompanying drawings and detailed in the following description of preferred embodiments. Description of well-known components and processing techniques are omitted so as not to unnecessarily obscure the invention in detail.

In an embodiment, the data entry mechanism of the present invention may be incorporated into a cellular phone. Because the data entry mechanism can be actuated by the tip of a stylus, instead of being designed for use only by a human finger, the size of the key buttons may be miniaturized to fit into the small size of the cellular phone.

In another embodiment, the data entry mechanism of the present invention may be incorporated into an encasement for a handheld computer. An example of the handheld computer is illustrated in FIGS 1A–1D.

1. System Overview of the Handheld Computer

FIG. 1A is an exploded view of a handheld computer 100 under an embodiment of the invention. A typical handheld computer is used to maintain calendars, to-do lists, contacts and memos. Examples of handheld computers for use with embodiments of this invention include any one of the PalmPilot™, Palm III™, Palm V™, and Palm VII™ organizers, manufactured y Palm Inc. Other embodiments of the invention can include Windows CE™ portable computers, or other handheld computers and personal digital assistants.

The handheld computer 100 includes a housing 110 having a top end 107, a bottom end 109, and lateral sides 117, 119. A user-interactive display 120 is provided on a front side 106 of the handheld computer 100. A plurality of application buttons 130 are accessible through the housing 110 at a portion below the display 120. The housing 100 includes a rectangular shape with a flaired bottom portion 122.

Figure 1B:
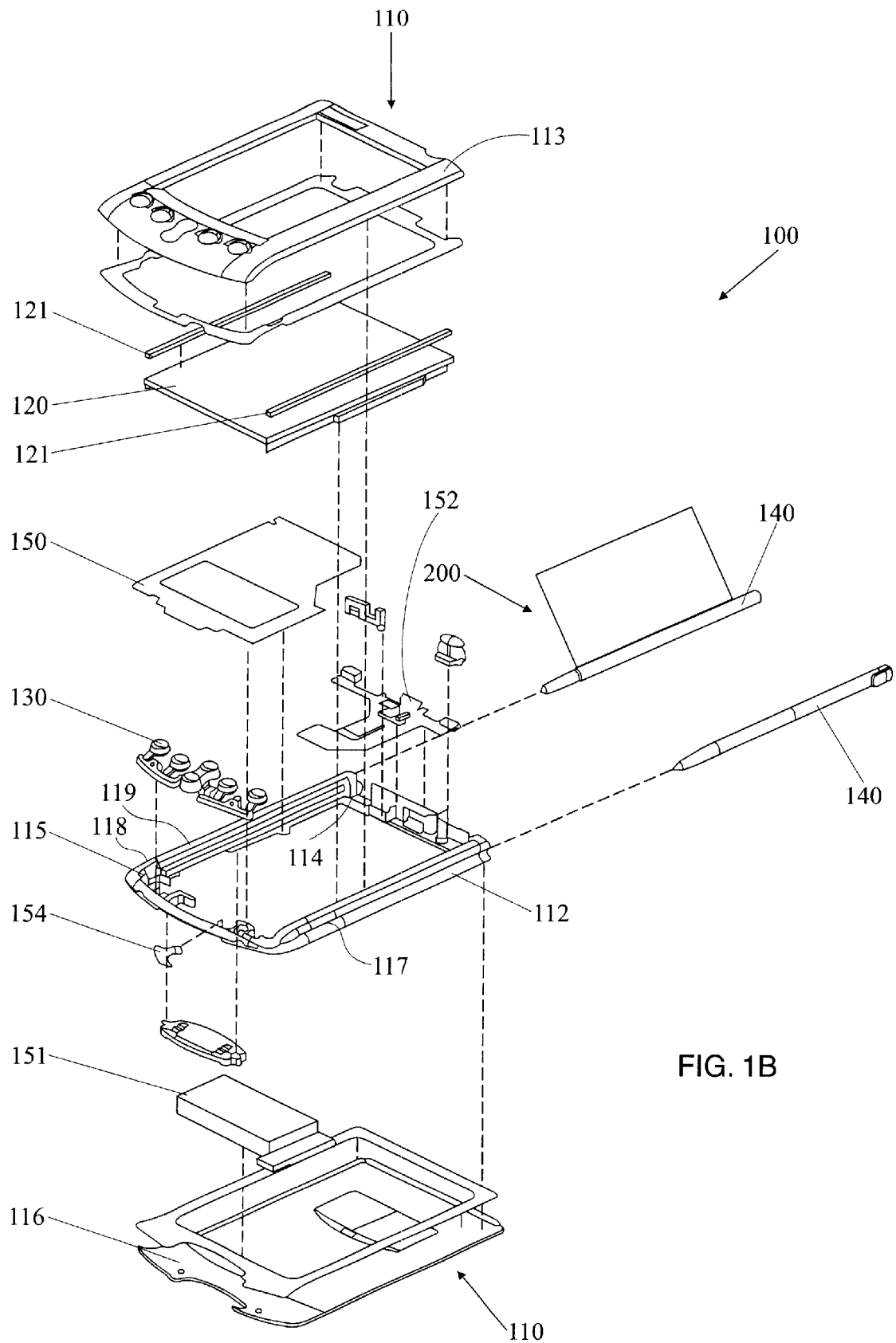

The handheld computer 100 includes one or more accessorial slots. Each accessorial slot is adapted to receive an accessory device. In an embodiment, a first and second accessorial slot 112, 114 (FIG. 1B) are provided on each lateral side 117, 119 of the housing 110. Each accessorial slot 112, 114 may e formed into the midframe 115 (FIG. 1B). Preferably, the accessorial slots 112, 114 are elongated and cylindrical to receive a stylus 140 (FIG. 1B). Each of the accessorial slots 112, 114 may retain stylus 140 for intermittent use with the handheld computer. As will be further described, one of the accessorial slots 112, 114 is also used under an embodiment to receive and retain a peripheral portion of the cover 200 (FIG. 2A).

FIG. 1B is an exploded isometric view of the handheld computer 100. The housing 110 includes a midframe 115 sandwiched between a front shell 113 and a back shell 116. The front shell 113, back shell 116, and one or more surfaces of midframe 115 combine to form a periphery of handheld computer 100. Midframe 115 may be molded or otherwise formed to match dimensions of front shell 113 and back shell 116. Midframe 115 may be partially enclosed by one or both of front shell 114 and back shell 116. The front shell 113, back shell 116 and midframe 115, combine to enclose and protect the internal components of the handheld computer 100. Midframe 115, front shell 113, and back shell 116 are coupled together using one or a combination of screws, hinges, clips, other suitable fasteners, and adhesives.

The housing 110 retains componentry of the handheld computer 100. The componentry includes a main board 150, battery 151, a flexible circuit 152, and an electrostatic discharge device 154. Display 120 may be separated from housing 110 by one or more gaskets 121. Gaskets 121 absorb shock and allow a close fit between housing 110 and display 120. If display 120 is a touch-sensitive display, gaskets 121 also act as a spacer to prevent housing 110 from inadvertently activating the touch-sensitive display.

Figure 1C:
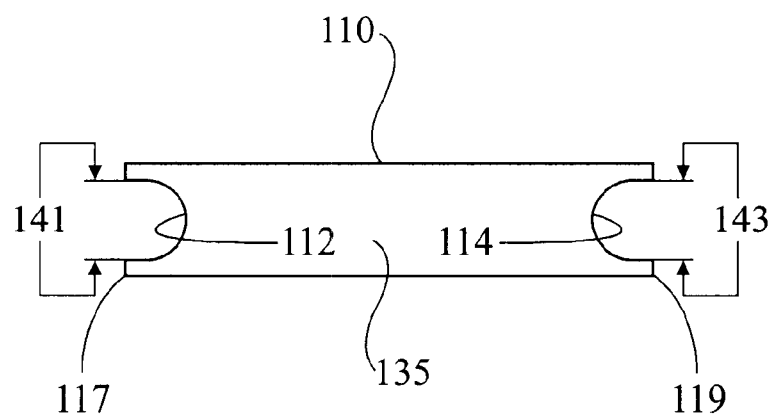

FIG. 1C illustrates a top view of the handheld computer 100. Housing 110 includes a top surface 135 having openings to the accessorial slots 112, 114. The accessorial slots 112, 114 are positioned adjacent a periphery of the housing, and preferably at the left and right lateral sides 117, 119. Each accessorial slot 112, 114 includes an open segment 141, 143, formed into the housing 110 that extends the length of the respective accessorial slot. Each open segment 141, 143, is a void formed in the housing along an arclength portion of a periphery for the respective accessorial slot 112, 114. Each open segment 141, 143, also extends lengthwise along the respective accessorial slot 112, 114 from the top bend 107 to the bottom bend 109 of the handheld computer. Therefore, the open segments 141, 143 of the respective accessorial slots 112, 114 access a length-wise surface of an accessorial device retained in the respective accessorial slot. Structures may be extended from or attached to the device inserted into one of the accessorial slots 112, 114 along the length accessible through the corresponding open segment 141, 143.

In this manner, accessorial slots 112, 114 allow for accessory devices such as covers 200 (FIG. 2A) to include a peripheral portion that slidably engages and couples to handheld computer 100 so as to retain structures such as a cover panel 204 (FIG. 2A). Cover panels can extend from the peripheral portions to cover surfaces on the handheld computer 100 including the display 120 and the application buttons 130. Further, the use of two or more accessorial slots 112, 114 enables the handheld computer 100 to retain an accessory device such as the cover 200 simultaneously with stylus 140.

Figure 1D:
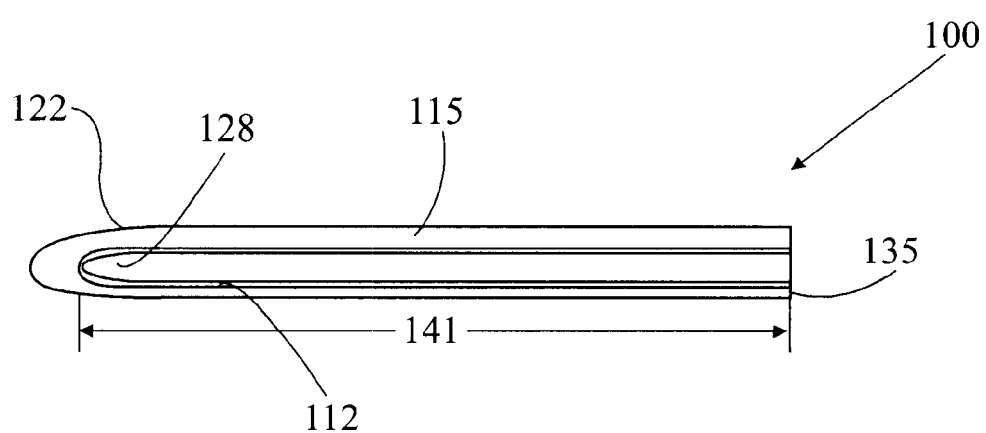

FIG. 1D is a length-wise view of one of the accessorial slots 112, 114 on the respective lateral side of the handheld computer 100. Accessorial slot 112 extends from an opening on the top surface 135 to the bottom portion 122. The accessorial slot 112 is preferably formed into the midframe 115 and includes a narrowing structure 128 positioned within or near the bottom portion 122. The narrowing structure 128 receives a tapered section of the device being inserted, which may include the stylus 140, the cover 200, or another accessory device. The open segment 141 extend the length of the accessorial slot 112.

2. Encasement Having a Stylus-Tappable Keyboard

The stylus-tappable keyboard of the present invention may be incorporated into an encasement for use with the handheld computer 100 illustrated in FIGS. 1A–D.

The encasement may be a single-cover encasement that covers the display surface of the handheld computer 100. The stylus-tappable keyboard may be incorporated into the interior surface of the cover. Alternatively, the encasement may be a dual-cover encasement that consists of two portions, a front portion that is extend ale over the display surface of the handheld computer and a back portion that is extend ale over the back surface of the handheld computer. The stylus-tappable keyboard may be incorporated into the interior surface of the front portion, or another surface of the encasement.

Figure 2B:
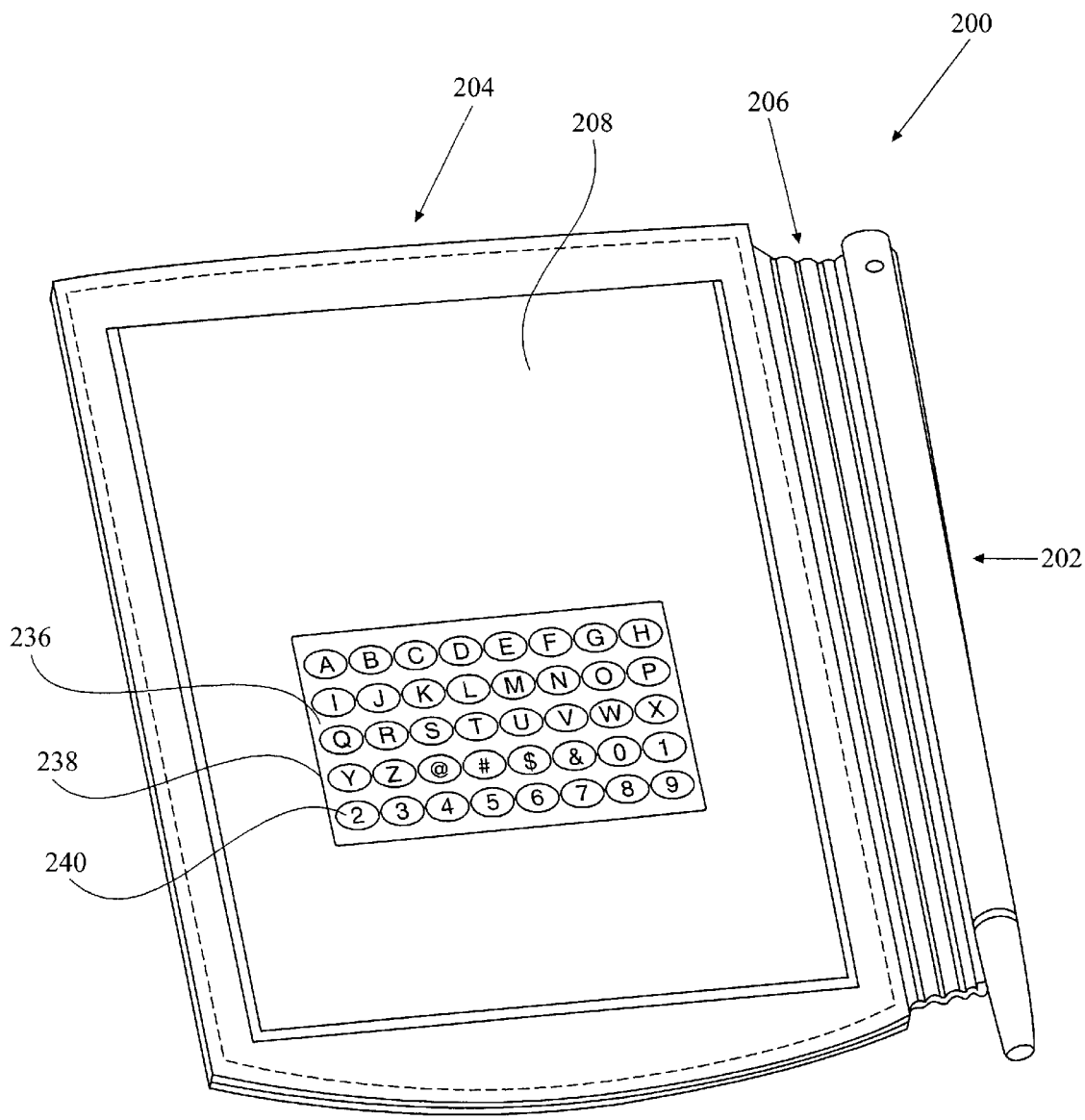
Figure 2C:
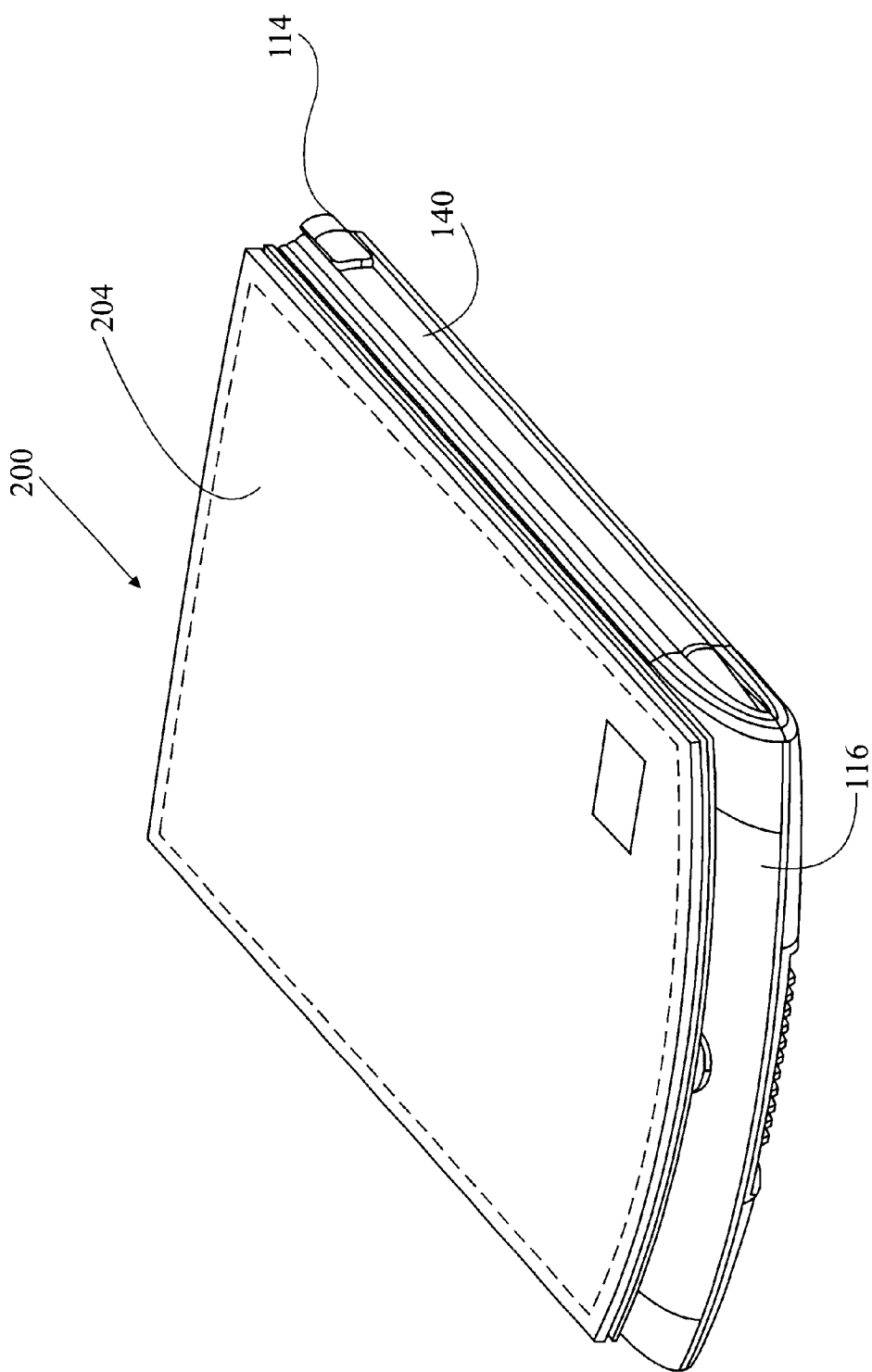

FIGS. 2A–C illustrate an embodiment of a single-cover encasement 200 having a stylus tappable keyboard incorporated into the interior surface of the cover.

FIG. 2A is a frontal view of a cover 200 under an embodiment of the invention. The cover 200 includes a peripheral portion that slidably engages an opening, slot or rail of the handheld computer 100. In an embodiment such as shown by FIGS. 1A–1D, the cover 200 is slidably coupled to either one of the accessorial slots 112, 114. The cover 200 includes a cover face 204 that extends from the peripheral portion. The cover face 204 protects features of the handheld computer 100 when the peripheral portion is engaged with the opening of the handheld computer 100.

As illustrated in FIG. 2A, peripheral portion of the encasement 200 includes a spine 202. The cover face 204 extends from the spine 202 so as to cover a surface on the handheld computer 100. A flex member 206 connects spine 102 to cover face 204. The cover face 204 is moveable about an axis of the spine 202 so as to move between a position adjacent the front surface 106 and a back surface 108 of the handheld computer 200.

Spine 202 is dimensioned to be received and retained by a slot or opening in the housing 110 of the handheld computer 100. Preferably, spine 202 is an elongate member having length and cross-section to be received and retained by one of the accessorial slots 112, 114. Spine 202 includes a cylindrical cross-section having a top end 212 and a bottom end 214. A tapered segment 226 is adjacent bottom end 214. The spine 202 is inserted into one of the accessorial slots 112, 114 with the bottom end 214 first.

The tapered segment 226, of spine 202 combines with the narrowing structure 128 (FIG. 1D) of the accessorial slots 112, 114 to facilitate retention of spine 202. A protrusion 215 extends from spine 202 near top end 212. The protrusion 215 is exposed when spine 202 is inserted into the slot of the handheld computer 100 so as to enable the spine 202 to de directed out of the accessorial slot 112, 114 from the top end 212. Movement of spine 202 traverses a single longitudinal axis of the accessorial slots 112, 114 to attach the cover to and detach the cover from the handheld computer 100.

The cover panel 204 includes a first face 233, and a second face 235 (FIG. 2B). Preferably, cover panel 204 is dimensioned to cover a dimension including the display 120 (FIG. 1A) and the application buttons 130. In this way, cover panel 204 prevents inadvertent entry into the handheld computer 100 through either the display 120 or the application buttons 130. Further, components and displays of the handheld computer 200 are protected from dust, dirt, scratching, or contact.

FIG. 2B shows the second or interior face 208 of the cover panel 204. As illustrated in FIG. 2B, a stylus-tappable keyboard 236 of the present invention is attached to or integrated with panel 204. A plurality of keys 240 are accessible structure 238. Each of the plurality of keys 240 is configured to be actuated by a stylus, such as the stylus 140 shown in FIG. 1B.

Preferably, each of the plurality of keys 240 is structured to define a concave surface or an indent/dimple to allow easy access by a stylus. By touching the concave surface of the key button with the tip of the stylus, the user firmly actuates the key to generate an electronic signal without letting the tip of the stylus to slip off the key button.

The keyboard 236 preferably includes alphanumeric keys and/or other characters such as analog characters. The keyboard 236 may also include non-English characters such as those of German, French, Spanish, Russian, Japanese, Korean and Chinese. These different kinds of languages may be interchangeale within the keyboard 236. The keys 240 may be arranged in the structure 238 of the keyboard 236 in an alphabetic or in a Qwerty layout.

FIG. 2C illustrates the single-cover encasement 200 in a position where cover face 204 is adjacent the front surface 116 of the handheld computer 100. The cover 200 is engaged with one of the accessorial slots 112 (not shown in this figure), and the stylus 140 is engaged with the other accessorial slot 114.

In this embodiment, the bottom region of the handheld computer 100 is left uncovered to keep the overall size of the handheld computer with cover as small and as pocketable as possible.

In addition, because each of the keys 240 has a concave, not a convex surface, the top surface of the keyboard can be at the same level or below the surface 208 of the encasement cover 204 (see FIG. 2B). Such a design avoids undesirable contact or friction of the keys against the display screen and further reduces the overall bulkiness of the handheld computer.

Figure 3A:
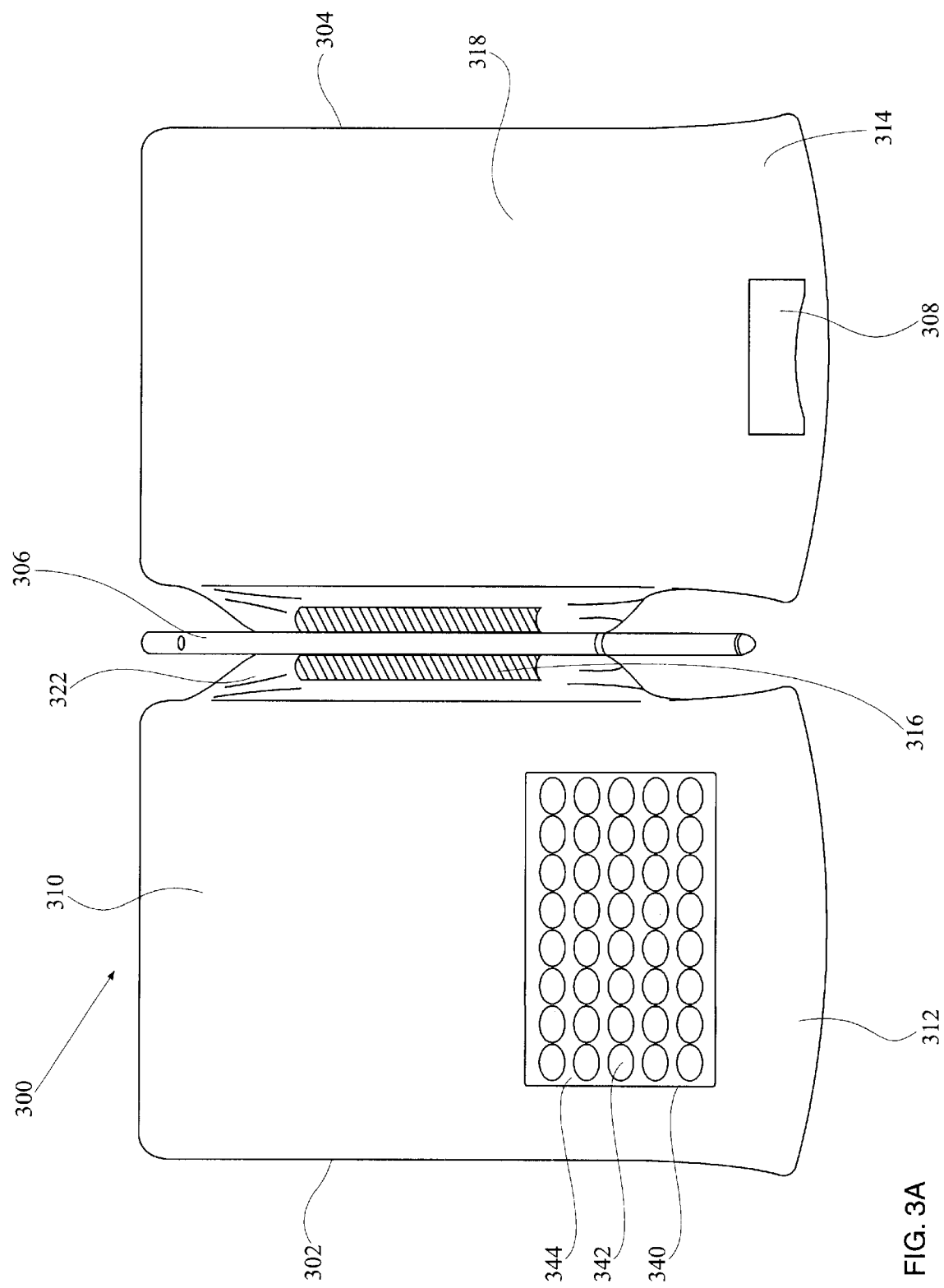
FIGS. 3A–C illustrate an embodiment of the encasement of the present invention
Figure 3B:
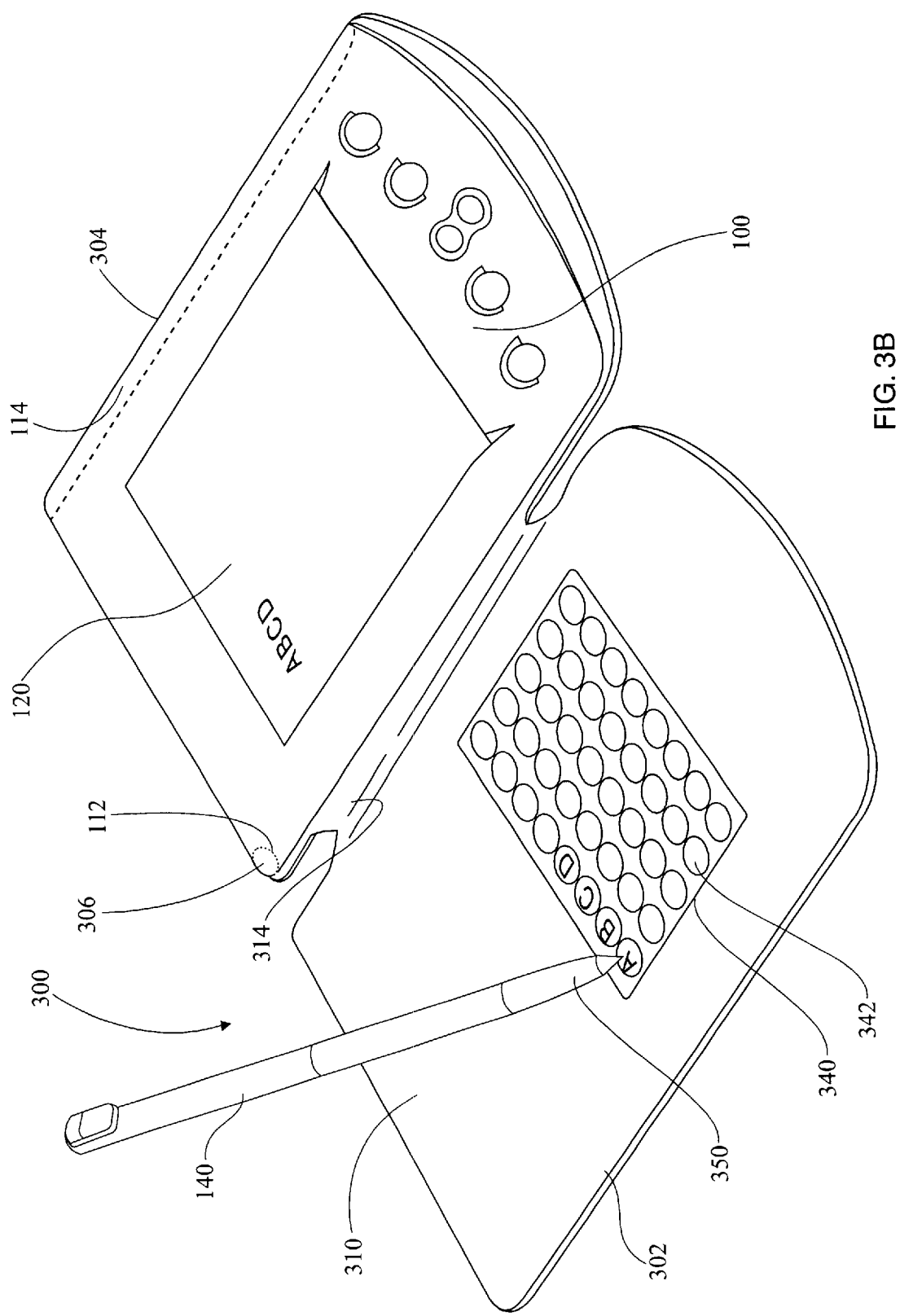
Figure 3C:
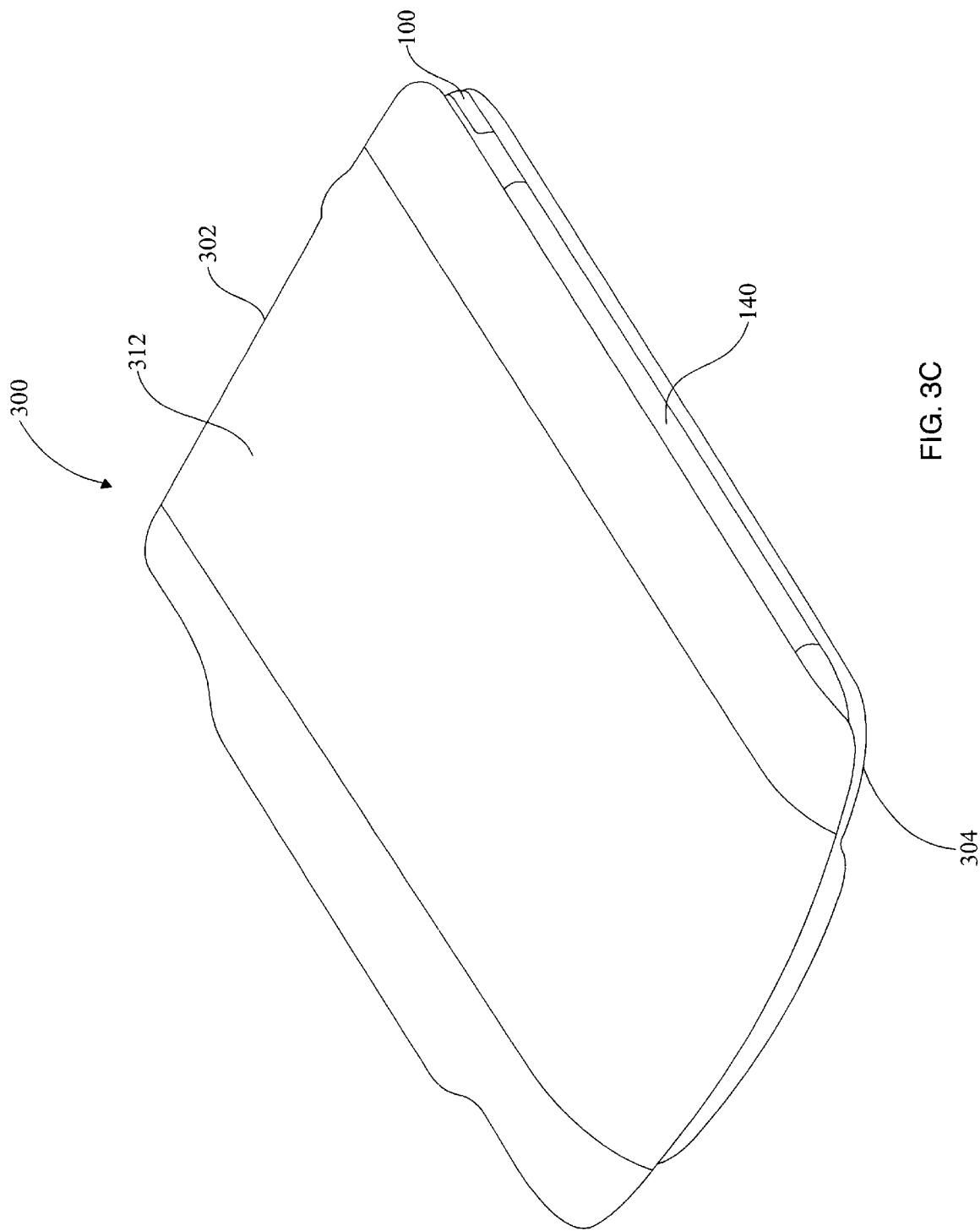

FIGS. 3A–C illustrate an embodiment of the dual-cover encasement 300 having a stylus-tappable keyboard incorporated into the interior surface of the front cover of the encasement. FIG. 3A shows the encasement 300 in an opened position. The encasement 300 has a front cover 302 with its interior surface 310 shown and a back cover 304 with its interior surface 318 shown. The encasement 300 includes a joint 322 to movably couple the front portion 302 to the back portion 304. The encasement 300 also includes a spine 306 that is coupled to the joint 322.

The spine 306 may be coupled by a double hinge 316 attached to a rigid joint. The double hinge 316enables the back portion 304 to be moved at least 180° adjacent to the handheld computer 100. The handheld computer' serial connector is then accessible to a mating connector on the communication cradle. This allows the handheld computer to, for example, synchronize with another computer through the communication cradle, without detaching the encasement.

Alternatively, the back portion 304 may also be designed to move about 360° to let the exterior surface 314 of the back portion 304 to contact the exterior surface 312 of the front portion 302.

As illustrated in FIG. 3A, a stylus-tappable keyboard 340 of the present invention is attached to or embedded in the exterior surface 310 of the front cover 302. A plurality of keys 342 are retained in a structure 344. Each of the plurality of keys 342 is configured to be actuated by a stylus, such as the stylus 140 shown in FIG. 1B.

Preferably, each of the plurality of keys 342 is structured to define a concave surface or an indent/dimple to allow easy access by a stylus. By touching the concave surface of the key button with the tip of the stylus, the user firmly actuates the key to generate an electronic signal without letting the tip of the stylus to slip off the key button.

The keyboard 340 preferably includes alphanumeric keys and/or other characters such as analog characters. The keyboard 340 may also include non-English characters such as those of German, French, Spanish, Russian, Japanese, Korean and Chinese. These different kinds of languages may be interchangeable within the-keyboard 340. The keys 342 may be arranged in the structure 344 of the keyboard 340 in an alphabetic or in a Qwerty layout.

The back cover 304 of the encasement 300 may include an opening 308 to allow access of a connector through the opening 308 to a handheld computer encased therein. The back portion 304 of the encasement 300 may optionally include two connectors, one located on the interior surface 318 of the back portion 304 and the other connector located on the exterior surface 314 of the back portion 304. The connector inside is capable of mating with a serial connector on the handheld computer while the outside connector is capable of mating with another connector of an accessory device such as a communication cradle. This connection enables the handheld computer to synchronize with another computer when the encasement is coupled to the handheld computer. For example, the encasement 300 having such a connector in the back portion 304 may be coupled to another connector on a communication cradle to facilitate data transfer between the encased handheld computer and a PC, without having the encasement electronically or physically decoupled from the handheld computer first.

FIG. 3B shows the encasement 300 having a heldheld computer 100 such as the handheld computer 100 illustrated in FIGS. 1A–D, encased therein. The handheld computer 100 is engaged with the encasement by the spine 306 of the encasement 300 through accessorial slot 112. A stylus 140 for data input may be coupled to another accessorial slot 114 of the handheld computer.

A user may use the stylus 140 for the handheld computer 100 to tap on the keys 342 of keyboard 340 to enter characters into the display 120 of the handheld computer 100. For example, when the tip 350 of the stylus 140 is tapped on the keys labeled "A", "B", "C" and "D" on the keyboard 340, the actuation of the keys being visually associable with the corresponding characters shown as "ABCD" on the display 120.

FIG. 3C is the frontal view of the encasement in the closed position. The exterior surface 312 of the encasement 300 may preferably have a contour with a compact and sleek shape. The encasement 300 may also have a portion 330 covering the spine 306 (not shown) within. Each of the keys 342 has a concave, not a convex surface and the top surface of the keyboard can be at the same level or below the interior surface 310 of the front cover 302 of the encasement 300 (see FIG. 3B). Such a design avoids undesirable contact or friction of the keys 342 against the display screen and further reduces the overall bulkiness of the handheld computer.

Figure 4A:
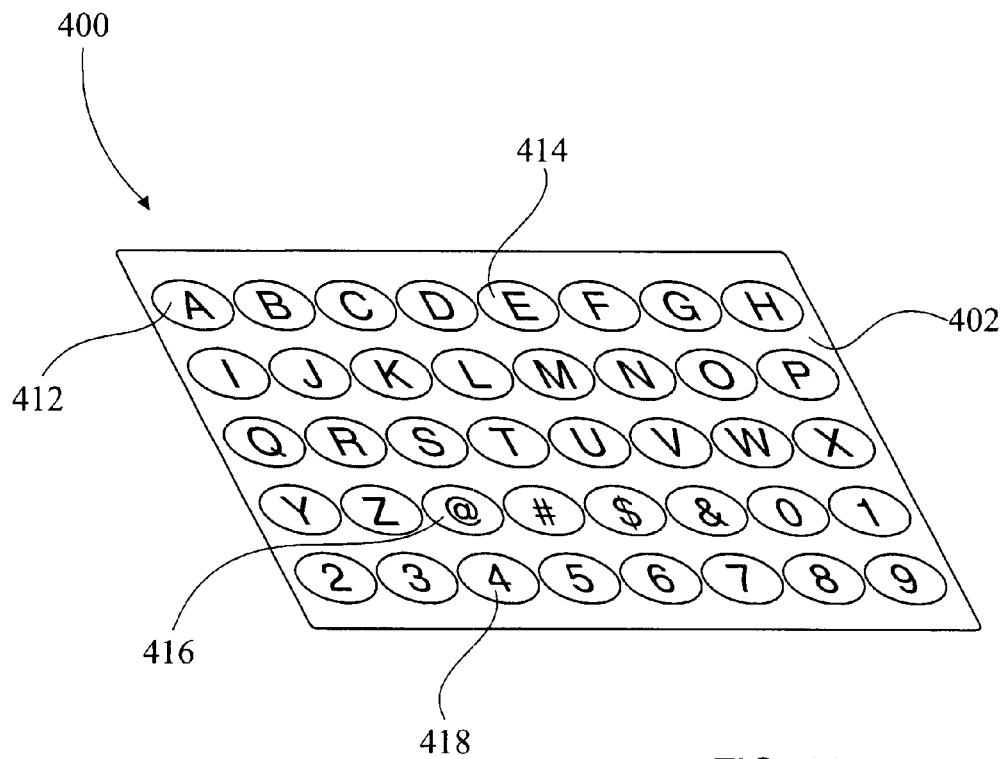
FIG. 4A illustrates a data entry mechanism (or a keyboard) having keys for alphanumeric characters and analog characters.
Figure 4B:
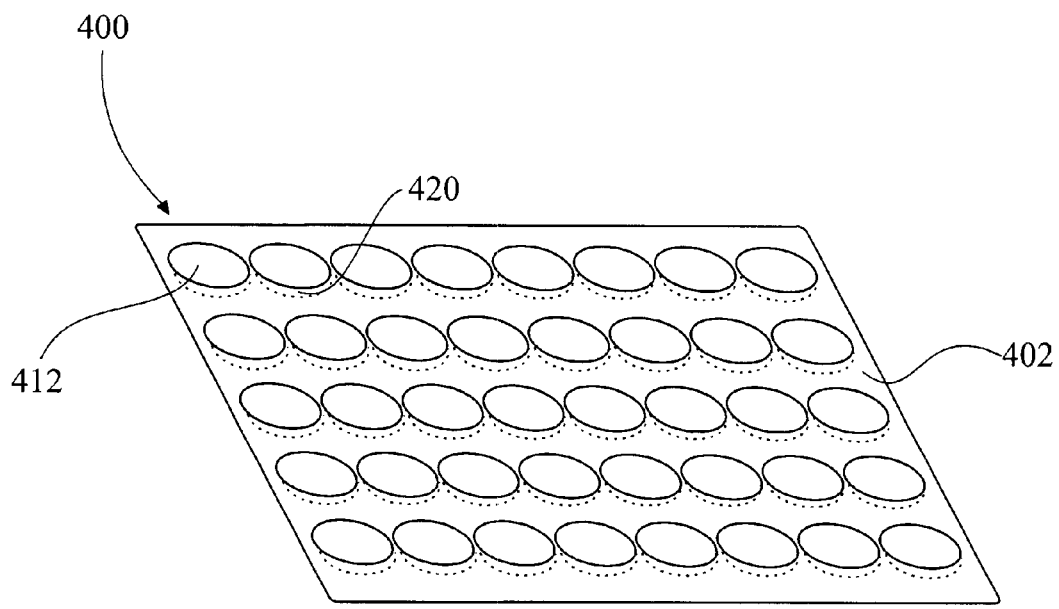
FIG. 4B illustrates the key buttons of a data entry mechanism (or a keyboard) having concave surfaces.

FIGS. 4A and 4B illustrate an example of the layout of a stylus-tappable keyboard 400 of the present invention on a surface 402 of any supporting structure, such as a cellular phone, a handheld computer 100 and an encasement for a handheld computer. As illustrated in FIG. 4A, each of the key button 402 of the keyboard 400 are labeled with alphabets 414, analog characters 416, and Arabic numbers 418 to facilitate entry of characters and numerical data. The keyboard 400 may also include non-text keys, such as function keys F1, F2, . . . and control keys such as "Control", "Alt", and "Shift". The keys for alphabets 414 are arranged in an alphabetic layout. The keys 412 may also be arranged in any other order, such as in a Qwerty layout.

Preferably, the dimensions of the buttons are sized to receive a stylus tip. The size of the button may be between about ¼" and ½" in diameter, preferably between about ⅜"

and 7/16" in diameter. In an embodiment, a shape of the keys may be elliptical. The shape of the keys may also be elliptical, with a short and long radius. Optionally, the buttons may also be actuated by a finger tip.

FIG. 4B illustrates a horizontal view of the keyboard attached to a surface 402 of a supporting structure. Preferably, each of the plurality of keys 412 is structured to define a concave surface 420 (or an indent/dimple) to allow easy access and actuation by a stylus. By touching the concave surface 420 of the key button 412 with the tip of the stylus, the user firmly actuates the key 412 to generate electronic signals without letting the tip of the stylus to slip off the key button 412.

3. Connectivity of the Keyboard to a Handheld Computer

Under an embodiment, a stylus-tappable keyboard, can be electronically connected to a wide range of computing and telecommunications devices. Examples of these devices include, but not limited to, notebook computers, handheld computers, phones and pagers, cameras, medical and industrial equipment, and watches.

When a key of the stylus-tappable keyboard is actuated by a stylus, the electronic signal generated may be transferred to a computing or telecommunications device in any way known in the art. For example, the electronic signal may be transferred through a slot connector, through PC-synchronization serial port, through a separate I/O port designed into the device, or through a wire connection directly to the device' mother board.

Alternatively, the electronic signal generated by actuation of the key by a stylus may be transferred through wireless communications between the keyboard and the handheld computer. In one embodiment, a short wave radio frequency (RF) port may be embedded in the keyboard to transmit the electronic signal to another RF port embedded in the device. The RF port may be Bluetooth-mediated.

In another embodiment, an infrared (IR) port may be incorporated in the keyboard to transmit the electronic signal from the keyboard to the device. The keyboard may include a processor that detects the status of the key and generates a status information presenting which key is actuated by the stylus. The IR port transmits the status information of the key actuated and sends the information through another IR port incorporated in the device.

In another embodiment, the encasement structure includes spine 202 to detachable engage accessorial slot 112 of handheld computer 100. The keys 342 may signal a handheld computer through a connector (not shown) on the spine 202 of the encasement structure. The spine of the encasement structure may connect to a slot connector on an interior surface of the accessory slot 112. Actuation of the keys 342 may signal an interrupt to a processor (not shown) of the handheld computer 100. An example of a connector on the spine 202 for use with a slot connector is disclosed in U.S. patent application Ser. No. 09/484,086, filed Jan. 18, 2000, entitled "Connector For Handheld Computer", incorporated by reference herein.

Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A data entry mechanism for a handheld computer, the mechanism comprising:

an encasement structure dimensioned to at least partially encase the handheld computer;

a spine extending from the encasement structure, wherein the spine is configured to engage and move within a slot of the handheld computer in order to attach the encasement structure to and detach the encasement structure from the handheld computer;

a connector provided on the encasement that is matable with a corresponding connector on the handheld computer; and a plurality of keys provided on the encasement structure, wherein one or more of the plurality of keys are configured to facilitate actuation by a stylus of the handheld computer, and wherein the plurality of keys electrically connect through the connector to the handheld computer when the encasement structure is coupled to the handheld computer.

2. The data entry mechanism of claim 1, wherein at least some of the plurality of the keys facilitate actuation by a stylus by including a surface having a concave surface formed thereon.

3. The data entry mechanism of claim 2, wherein the concave surface of one or more keys has a groove to facilitate the stylus in contacting and actuating the key.

4. The data entry mechanism of claim 1, wherein at least some of the plurality of keys facilitate actuation by the stylus by being dimensioned between about ¼ inch and ½ inch in diameter.

5. The data entry mechanism of claim 1, wherein at least some of the plurality of keys facilitate actuation by the stylus by being dimensioned between about ⅜ inch and 7/16 inch in diameter.

6. The data entry mechanism of claim 1, wherein one or more of the plurality of keys include markings representing keys of an alphabet.

7. The data entry mechanism of claim 1, wherein one or more of the plurality of keys include markings representing keys of a numeric set.

8. The data entry mechanism of claim 1, wherein one or more of the plurality of keys include markings representing keys of a non-English alphabet.

9. The data entry mechanism of claim 8, wherein the markings represent keys from an alphabet set in a language is selected from the group consisting of German, French, Spanish, Chinese, Japanese, Korean and Russian.

10. The data entry mechanism of claim 1, wherein at least some of the plurality of keys are arranged on a surface of the encasement structure in a Qwerty layout.

11. The data entry mechanism of claim 1, wherein the connector is a serial connector.

12. The data entry mechanism of claim 1, wherein the connector is a wireless communication port.

13. The data entry mechanism of claim 12 wherein the wireless communication port is an RF or IR port.

14. The data entry mechanism of claim 1, wherein the connector includes a wire connection adapted to connect with a printed circuit board of the handheld computer and capable of transferring the electronic signal generated upon actuation of the keys in the plurality of keys.

15. The data entry mechanism of claim 1, wherein the connector is an input/output port that is capable of transferring electronic signals generated upon actuation of the keys.

16. An encasement for a handheld computer, comprising:

an encasement structure dimensioned to at least partially encase the handheld computer;

a spine extending from the encasement structure, wherein the spine is configured to engage and move within an accessory slot of the handheld computer in order to attach the encasement structure to and detach the encasement structure from the handheld computer;

a connector provided on the encasement that is matable with a corresponding connector on the handheld computer; and a plurality of keys arranged on a surface of the encasement structure, wherein the plurality of keys connect through the connector to the handheld computer when the spine is engaged with the slot so that the plurality of keys are actuable to signal an alphanumeric entry to the handheld computer.

17. The encasement of claim 16, wherein a configuration of each of the plurality of keys facilitates actuation of the key by a stylus.

18. The encasement of claim 16, wherein the encasement structure is dimensioned to substantially encase the handheld computer when the encasement structure is attached to the handheld computer.

19. The encasement of claim 17, wherein each of the plurality of the keys facilitates actuation by a stylus by providing a concave surface to receive the stylus.

20. The encasement of claim 19, wherein the concave surface has a groove for receiving a stylus tip.

21. The encasement of claim 16, wherein each of the plurality of the keys is dimensioned between about ¼ inch and ½ inch in diameter.

22. The encasement of claim 16, wherein each of the plurality of the keys is dimensioned between about ⅜ inch and 7/16 inch in diameter.

23. The encasement of claim 16, wherein one or more of the plurality of keys include markings representing keys of an alphabet.

24. The encasement of claim 16, wherein one or more of the plurality of keys include markings representing keys of a numeric set.

25. The encasement of claim 16, wherein one or more of the plurality of keys include markings representing keys of a non-English alphabet.

26. The encasement of claim 25, wherein the markings represent keys from an alphabet set in a language is selected from the group consisting of German, French, Spanish, Chinese, Japanese, Korean and Russian.

27. The encasement of claim 16, wherein the plurality of keys are arranged on a surface of the encasement structure in a Qwerty layout.

28. The encasement of claim 16, wherein the connector is a serial connector.

29. The data entry mechanism of claim 16, wherein the connector is a wireless communication port.

30. The data entry mechanism of claim 31, wherein the wireless communication port is an RF or IR port.

31. The data entry mechanism of claim 16, wherein the connector includes a wire connection adapted to connect with a printed circuit board of the handheld computer and capable of transferring the electronic signal generated upon actuation of the keys in the plurality of keys.

32. The data entry mechanism of claim 16, wherein the connector is an input/output port that is capable of transferring electronic signals generated upon actuation of the keys.

* * * * *